US008042097B2

United States Patent
Aridor et al.

(10) Patent No.: US 8,042,097 B2
(45) Date of Patent: *Oct. 18, 2011

(54) AUTOMATED SEMANTIC-BASED UPDATES TO MODIFIED CODE BASE

(75) Inventors: Yariv Aridor, Yaakov (IL); Alan J. Wecker, Misgav (IL); Blair Wyman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 561 days.

This patent is subject to a terminal disclaimer.

(21) Appl. No.: 12/248,065

(22) Filed: Oct. 9, 2008

(65) Prior Publication Data

US 2009/0044178 A1  Feb. 12, 2009

Related U.S. Application Data

(63) Continuation of application No. 10/631,925, filed on Jul. 31, 2003, now Pat. No. 7,454,745.

(51) Int. Cl.
G06F 9/44 (2006.01)
G06F 9/45 (2006.01)
G06F 17/22 (2006.01)

(52) U.S. Cl. ......... 717/122; 717/136; 717/170; 715/229

(58) Field of Classification Search .................. None
See application file for complete search history.

(56) References Cited

U.S. PATENT DOCUMENTS

| | | |
|---|---|---|
| 6,385,768 B1 | 5/2002 | Ziebell |
| 6,546,552 B1 | 4/2003 | Peleg |
| 6,678,882 B1 | 1/2004 | Hurley et al. |
| 7,131,112 B1 | 10/2006 | Bartz et al. |
| 2003/0167446 A1 | 9/2003 | Thomas |
| 2004/0083199 A1 | 4/2004 | Govindugari et al. |

OTHER PUBLICATIONS

"CVS—Concurrent Versions System v1.11.3," http://www.cvshome.org/docs/manual/cvs.html, printed Feb. 3, 2003.
"CVS—Concurrent Versions System v1.11.3: Overview," http://www.cvshome.org/docs/manual/cvs_1.html, printed Feb. 3, 2003.
Per Cederqvist et al., "Version Management with CVS, for CVS 1.11.3," 1992, 1993 Signum Support AB.
Cederqvist, "Version Management with CVS" Nov. 2, 1993, Signum Support AB, excerpts from release 0.9 for CVS 1.3+, 5 pages, accessed online at <http://www.cs.utah.edu/dept/old/texinfo/cvs/cvs_1.html>on Dec. 18, 2007.
Krause, "CVS: An Introduction" Jul. 2001, Linux Journal, vol. 2001, Issue 87, 5 pages.

*Primary Examiner* — James D Rutten
(74) *Attorney, Agent, or Firm* — Wood, Herron & Evans, LLP

(57) ABSTRACT

An apparatus and program product generate difference data representative of modifications made to one release of a standard code base to facilitate the adaptation of later releases of the standard code base. The difference data is generated at least in part in connection with canonical parsing of a modified version of a release of a standard code base such that the difference data is representative of semantic changes made in the modified version.

22 Claims, 5 Drawing Sheets

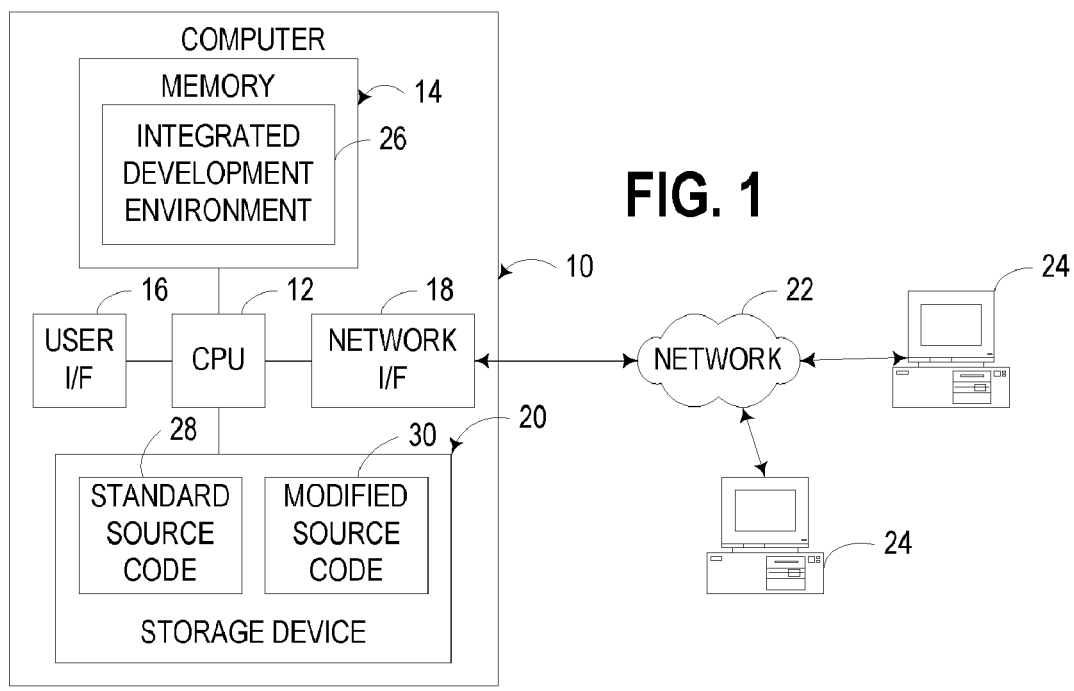
FIG. 1
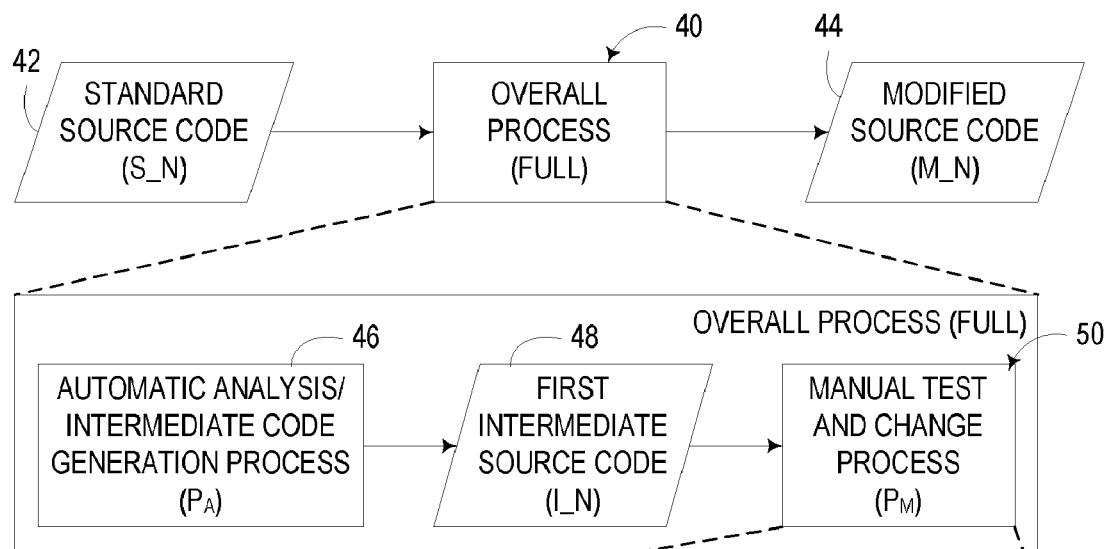
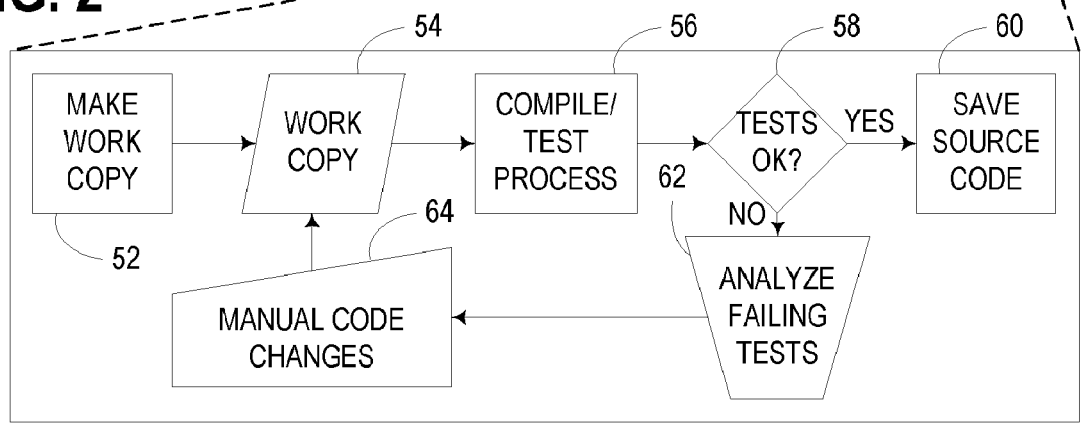
FIG. 2

AUTOMATED SEMANTIC-BASED UPDATES TO MODIFIED CODE BASE

CROSS-REFERENCE TO RELATED APPLICATIONS

This application is a continuation of U.S. patent application Ser. No. 10/631,925, filed on Jul. 31, 2003 by Yariv Aridor et al. (ROC920020171US1), the entire disclosure of which is incorporated by reference herein.

FIELD OF THE INVENTION

The invention relates to computers and computer software, and in particular, to computer software development and compilation.

BACKGROUND OF THE INVENTION

As computers and the computer software that runs on such computers increase in performance and complexity, the development of computer software becomes increasingly expensive, difficult and time consuming. One predominant manner of combating the difficulties of software development is through increased reliance on pre-existing code. Object-oriented software design is premised in large part on the concept of code reuse, where software is compartmentalized into objects that are individually created, tested and refined, and where more complex objects are built by assembling together simpler objects to leverage the prior efforts of others, and avoiding the need to develop new software entirely from scratch.

The software executing on a computer is often highly layered, with program code resident in one layer relying on the services of program code resident in lower layers. As an example, a computer application may rely on one or more libraries of commonly-used functions, which themselves often rely on an underlying operating system to provide lower level services to the application and/or the libraries. Likewise, an operating system may rely on drivers to facilitate the management, control and access to various hardware resources in a computer, as well as extremely low level kernel and BIOS code to support the fundamental memory and task management duties for the computer.

To facilitate the reuse of code in a given software layer, it is often necessary for the software layer to provide a consistent interface to program code that may be resident in higher layers. An interface typically refers to the names or identities of the functions that are accessible in a given layer of software, as well as the expected inputs and outputs for those functions. As a result, even if the underlying code is updated, extended or otherwise modified, so long as the same interface is maintained in a given layer of code, higher layers of code that access that layer of code will often still be able to access the functions in that layer of code with little or no modification.

Another manner in which software reuse can be leveraged is through the adaptation of the same software on different types of computers. Software is often written, for example, in a relatively system-agnostic and human readable source code format, and then compiled by a compiler into a system-specific and machine readable object code format. In many instances, if compilers exist for multiple types of computers, the same source code can be compiled by different compilers into system-specific object code for execution on those different types of computers. Further, in many instances such compilation can occur with little or no customization of the source code for a particular computer type.

Still another manner of leveraging software reuse is through the use of virtual software machines such as supported by the Java programming language developed by Sun Microsystems. Rather than being compiled for a particular type of computer, Java programs are typically compiled into an intermediate format that is system-independent. Java virtual machines, specifically developed for and resident on different types of computers, then interpret or further compile the intermediate format versions of Java programs to permit the same intermediate format version of a Java program to run without modification on the various different types of computers.

Software that is intended to be compiled, interpreted or otherwise configured to execute on different types of computers often takes the form of a standardized code base. In many instances, however, and despite efforts to implement a code base as generically as possible, substantial modifications may nonetheless be required to specifically adapt a standardized code base to operate accurately and efficiently on a particular type of computer. Particularly when the standardized code base is adapted for a particular type of computer by an entity other than that which developed the original standardized code base, substantial efforts may be required on the part of that other entity.

As an example, the Java programming language supports a number of libraries that often must be specifically adapted for use on different types of computers. The Java Abstract Window Toolkit (AWT), for example, is a library package that provides a number of graphical user interface capabilities for Java programs, such as the creation and manipulation of windows, menus, buttons, etc. The Java AWT package is generically designed to run on a single-user computer, whereby the display of graphical user interface components occurs on the same computer upon which a Java program is executing. In some computer environments, e.g., in client/server computer environments, the display of graphical user interface components may occur on a different computer than that upon which a Java program is executing. As a result, in such environments, the Java AWT package must be adapted to operate in a distributed manner, so that requests in a program running on one computer to perform such operations as creating or updating windows, buttons, etc., are forwarded over a network to another computer for display.

While such adaptation can be costly and time consuming, it can be manageable if the underlying standard code base remains constant. For example, automated tools may be usable in some instances to adapt certain portions of a code base for a particular target platform. Of note, however, it has been found that such automated tools are often limited in capabilities, and some degree of manual adaptation is almost always required.

However, if the standard code base is updated or revised from time to time, the specialized adaptations of the code base will likewise need to be updated for compatibility with the updates to the standard code base. Reproducing such adaptations, however, has traditionally required manually reapplying the same changes made to an earlier version of a standardized code base to the later version of the same. Over time, repeated updates to a standardized code base can place significant support burdens on the entities that maintain the specialized adaptations of that code base. To the extent that the adaptation of a standard code base could be automated, the burdens associated with performing such adaptations could be dramatically reduced. As such, a need exists in the art for a manner of automating the adaptation of standard code bases to specialized adaptations thereof.

In some programming environments, system dependent changes in source code may be accounted for using "conditional compilation" constructs. With such constructs, sections of system-specific code for multiple systems can be incorporated into the same source code, with compiler commands used to filter out unneeded code during compilation for a particular target platform.

Using conditional compilation, system specific changes to a shared or standard code base can be safely saved directly in that code base, without affecting other system specific changes, given that irrelevant system-specific changes will effectively be filtered out during compilation for a particular platform. Moreover, by using conditional compilation, system specific changes made in a code base can often be made available in subsequent releases of that code base with little additional effort.

In some programming environments, however, conditional compilation is not supported. As a result, system specific changes often cannot be saved back in the standard code base, and every iteration of the development cycle (for system specific changes) must effectively start from scratch, with many if not all of the same adaptations made to the prior version of the code base having to be manually applied to the new version of the same. Even where automated tools are used to automatically adapt portions of a code base for use on a particular target platform, the remaining manual adaptations that are practically always required still must be applied.

It has been found, however, that such manual changes can be difficult to reconstruct, particularly given the realities of the business world, where programmers may come and go, and where code documentation may not be as comprehensive as it should be. Reproducing some of the changes made to a prior version of an adapted code base into a new version of the adapted code base may therefore require substantial study of the previous version of the adapted code base, as well as additional testing to ensure that all adaptations have been properly incorporated.

In addition, certain software version control environments support the ability to maintain multiple versions of software through storage of only the differences between versions. Such environments, however, typically rely on a rudimentary line-by-line analysis of software versions, so that different versions of software can be recreated simply by reapplying difference information to prior versions of the software. However, line-by-line analysis cannot distinguish between semantic differences (i.e., differences that alter the program structure or operation) and non-semantic differences. As a result, even irrelevant changes such as the ordering of methods or classes, changes in comments, and/or the addition or elimination of line breaks, will be identified by line-by-line analysis, often rendering such analysis useless for identifying semantic changes made to a version of software.

A significant need therefore exists in the art for a manner of facilitating the adaptation of a standard code base, and in particular, to reduce the degree of manual intervention required to adapt updated versions of a standard code base.

SUMMARY OF THE INVENTION

The invention addresses these and other problems associated with the prior art by providing an apparatus and program product that generate difference data representative of modifications made to one release of a standard code base to facilitate the adaptation of later releases of the standard code base. The difference data is generated at least in part in connection with canonical parsing of a modified version of a release of a standard code base such that the difference data is representative of semantic changes made in the modified version.

The canonical parsing serves to parse the modified version into semantic components. Canonical parsing may also be applied to other versions of the same release of the standard code base such that the differences in semantic components in the modified and other versions can be ascertained. For example, an unmodified version of the standard code base may be used as the starting point from which differences are identified in a modified version. Alternatively, an intermediate version of the standard code base may instead be used. For example, the intermediate version may incorporate automatic changes made to a standard code base, e.g., as a result of automated source transformation, and the modified version may incorporate manual changes applied to the intermediate version after automated source transformation has been completed.

Under either scenario, where manual changes are incorporated into a modified version of a standard code base, many if not all of those manual changes may often be automatically incorporated into a later release of the standard code base. As a result, the aforementioned difficulties associated with reapplying manual changes to a standard code base can often be mitigated.

Therefore, consistent with the invention, a standard code base may be adapted by canonically parsing a modified version of a first release of a standard code base to generate a canonically-parsed representation of the modified version, generating difference data representative of changes made to the first release of the standard code base using the canonically-parsed representation of the modified version, and using the difference data in applying the changes made to the first release of the standard code base to a second release of the standard code base.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 1 is a block diagram illustrating the principal hardware and software components in a development computer incorporating a semantic-based difference system consistent with the invention.

FIG. 2 is a flowchart illustrating a sequence of steps utilized in adapting a standard code base using the development computer of FIG. 1.

FIG. 4 is a block diagram of the semantics-based difference analysis process referenced in FIG. 3.

DETAILED DESCRIPTION

Figure 3:
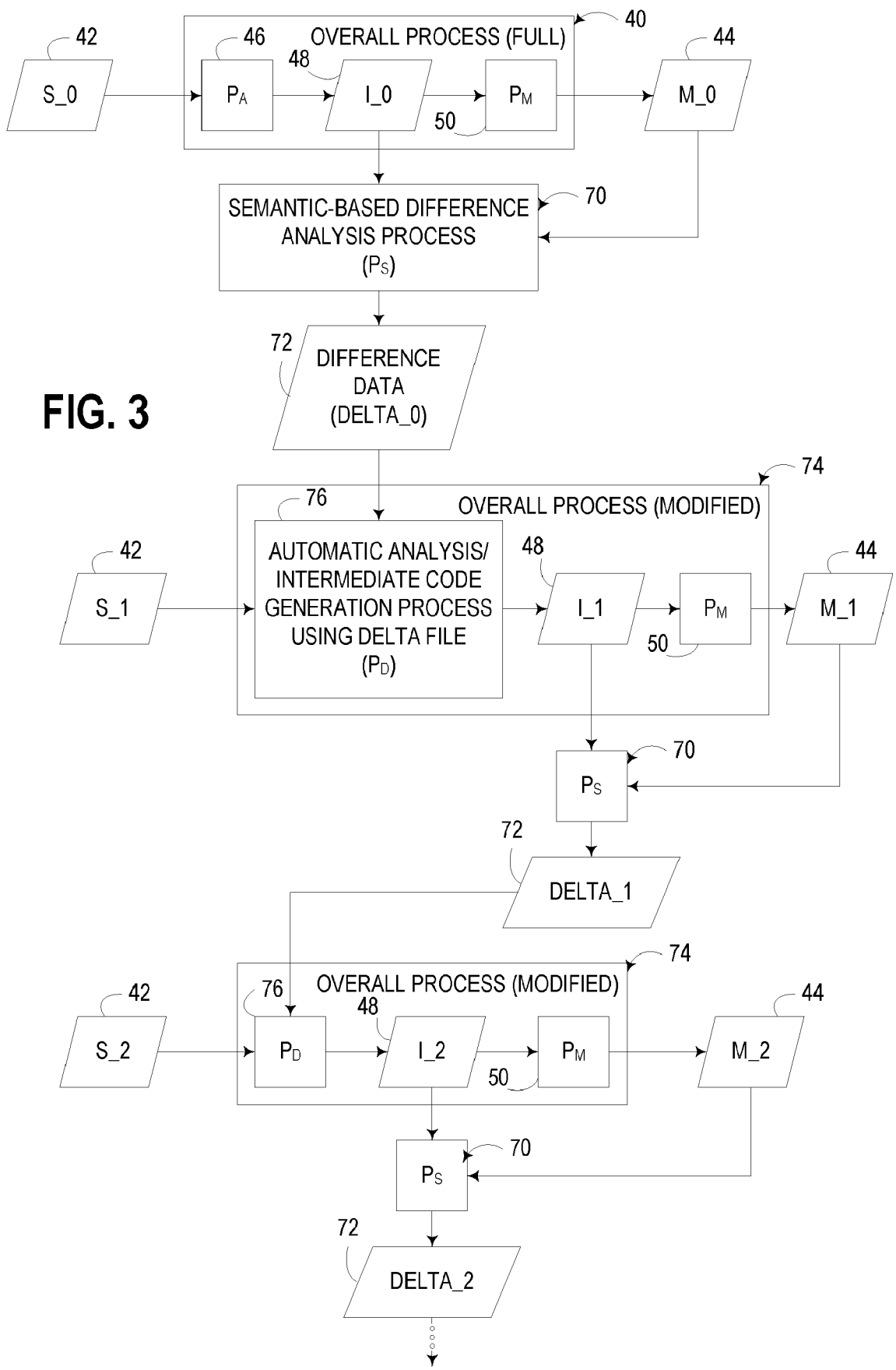
FIG. 3 is a flowchart illustrating a sequence of steps utilized in adapting subsequent versions of a standard code base to that customized in FIG. 2, and in a manner consistent with the invention.

The hereinafter-described embodiments facilitate the adaptation of a version of a standard code base to a specialized form by parsing a prior version of an adapted code base to identify certain changes applied to that prior version. When identified, such changes may then be automatically applied to the later version of the code base (if appropriate), or in the least reported to a developer to assist that developer in making the appropriate manual modifications to the later version.

While embodiments consistent with the invention may be utilized in connection with applying updates to a wide variety of standard code bases, the embodiments discussed hereinafter will focus on an exemplary implementation of the invention in connection with adapting a code base such as portions of the Java Development Kit from Sun Microsystems for use in an eServer iSeries midrange computer system from International Business Machines Corporation. The specific examples presented below, in particular, focus on the adaptation of the Java Abstract Window Toolkit (AWT) library package to implement a distributed Graphical User Interface (GUI) in a client/server environment.

A standard code base in the context of the invention may include practically any program code that capable of being specifically adapted or otherwise modified by a developer. Moreover, a release of a standard code base may be considered to be any variant of a standard code base as it exists at a particular point in time. Typically, for example, a release of a standard code base will be based upon a major or minor update to the program code, e.g., where the program code is designated with a version and/or release number that distinguishes the program code from other releases. It will be appreciated, however, that the invention may be utilized in connection with updating an innumerable number of types of standard program code, and as such, the invention is not limited to the particular embodiments discussed herein.

It will further be appreciated that the adaptation of a standard code base may incorporate manual changes alone, or more typically, a combination of manual and automated changes, e.g., using automated tools to apply changes in a formulaic manner. Consistent with the invention, manual changes, or alternatively, a combination of manual and automated changes, may be identified via a comparison between the adapted (or modified), and standard (or unmodified) versions of the code base.

Such a comparison may be made, for example, using a canonicalizing parser, whereby each version is canonicalized into a defined structure having a consistent semantic ordering, with methods and classes ordered in a predetermined fashion (e.g., alphabetically), and with extraneous data such as comments removed. A comparison may then be made to identify changes to particular program entities (e.g., classes, methods, code sections, statements, instructions, variables, declarations, imports, dependencies, fields, etc.), as well as to identify new or removed program entities.

In the alternative, even when a combination of automated and manual changes are incorporated, the manual changes may be identified by comparing the adapted or modified version of the code base to an intermediate version that incorporates only the automated changes. By doing so, the same automated changes may be made to the later version of the standard code base using the same automated tools, with the identified manual changes then applied to the later version after processing by the automated tools.

Irrespective of whether automated changes are identified along with manual changes, once changes are identified, it is desirable to format these changes for reapplication in future versions of a code base. In the illustrated embodiments, for example, it may be desirable to classify the changes according to semantic element, and then save the changes in one or more data files, e.g., in XML files (hereinafter referred to as "DELTA files").

Thereafter, when a later version of a code base needs to be adapted, the automated portion of the adaptation may incorporate not only the use of any automated tools used to make automated changes to the prior version, but also the use of any DELTA files to automatically apply prior manual changes and/or notify a developer of what program entities were manually changed in the prior version.

Through the use of a canonical parsing tool as described herein, non-semantic changes to a code base are effectively ignored, and thus the manual change data is typically restricted to identifying only the programmatic differences in the code base. This is in contrast to a more conventional software version control environment, which stores differences non-semantically (typically from line-by-line comparisons between versions). As an example, if a software version control environment that implemented a line-by-line analysis were to process a code base where the only change in the code base was the ordering of the methods or classes (e.g., from alphabetically to reverse alphabetically), the environment would identify the entire code base as being changed. In contrast, the canonical method described herein would typically disregard such non-semantic differences, and identify that no manual changes were required.

Furthermore, the canonical method described herein may address other non-semantic changes such as changes in file names. Furthermore, in certain instances, a finer level of semantic meaning can be applied to changes (e.g. before start of method, before last method return, before all method returns) and if methods have a special structure, such semantic knowledge may be used to further refine the code.

In general, the canonicalizing parsing tool described in greater detail below operates by initially breaking up code segments (e.g., Java classes) into semantic components (e.g., fields, methods, import statements, etc.) via parsing. Next, the semantic components are reordered in a defined manner, e.g., alphabetically, and the corresponding semantic components of the standard version are compared with those of the modified version, with the identified differences being represented in an XML file per code segment, where every tag represents a component (e.g., method M1) with a name attribute denoting the name of the component (e.g., M1) and a change attribute describing what happens to that component (e.g., component was deleted/modified/added/replaced in the modified version). The XML files are based on a Document Type Definition (DTD) file defining the semantic components. In the case of modification, replacement, or addition of a semantic component, the tag data typically contains the changes in the form of new code. In the case of modification, the old version may also be saved in a dedicated source tag.

To then reapply the identified changes to a later version of the code base, the XML files may be automatically applied by processing the XML file for each code segment, parsing the new version of the code segment to obtain its semantic components, and, for each component, examining the corresponding element in the XML file (typically identified by a name attribute). The tag data in the XML file is then used to apply changes to that component (typically defined by change attributes), if appropriate.

The herein-described process may also be embedded within an automated source transformation tool to further the automated generation of a specialized version of a code base. For example, to modify the Java AWT package to support a distributed GUI, an automated tool may be used to automate the generation of "stubs" and "proxies" for various classes used in the distributed GUI. The output of such a tool may then be processed via the aforementioned process to apply further manual changes to the modified code base.

In the illustrated embodiments, several special cases are identified. First, when a new semantic component is identified in a new version of a standard code base (i.e., the component was not present in the prior version), the developer is simply notified of the existence of the new component. Second, when a semantic component is removed from a prior version (i.e., the component is not present in the new version), that semantic component is typically ignored. Third, when a semantic component is replaced, the implication is that the changes made on the original component can also apply to the current component. Fourth, when a semantic component is modified, the implication is that changes that were originally applied to the original semantic component may not be valid for the current component. In that instance, the developer is simply notified of the modification to the component.

A canonicalizing parser used in connection with the herein-described embodiments typically generates a tree structure including a plurality of nodes, where each node is either (1) a leaf node (which has no descendants), (2) a root node (which has no ancestors), or (3) an intermediate node (which has both ancestors and descendants). Each node further represents some level of semantic abstraction, such as a "constructor" node or an "if-statement" node, and each node can be uniquely "named" using the type of the node, its depth or location, and any source code identifier information relevant for the node. Between two compilation unit trees, pairs of like named nodes are "compared", and their differences quantified and/or extracted. In some embodiments, comparing two nodes may also involve comparing their descendants. Further, in some embodiments the nature of comparisons between nodes in two trees may be controlled at multiple "levels" (depths) in the parse tree, e.g., to ignore all differences in certain methods in a given class, to collapse empty scopes and canonicalize the braces when comparing any two methods, to ignore differences within if statements when the boolean test contains a certain string, etc.

In some embodiments, the discovered differences between nodes may be stored in a location respective to the name of the node (e.g. in an XML file). Common node idioms may be recognized, and abstracted into sequences of macros. Moreover, sets of differences may affect the subsequent generation of different types and instances of files (e.g. generating both "skeleton" and "stub").

As such, a canonicalizing parser consistent with the invention will typically operate by ordering all "position neutral" nodes (i.e. constructors, methods, fields) of the two versions of the code base to be compared in some canonical fashion. The two canonical parse trees are then simultaneously traversed and compared, node by node, according to previously specified comparison parameters. Each detected "difference" is then extracted into some persistent form (e.g., as part of an XML file), thus forming a machine readable "minimized" form of the changes made between the versions, which can then be subsequently used to reapply the changes necessary when a new version of the standard code base is released.

It will be appreciated that the implementation of the herein-described functionality is well within the ability of one of ordinary skill in the art having the benefit of the instant disclosure. Moreover, it will be appreciated that various modifications may be made to the herein-described embodiments without departing from the scope of the invention.

Now turning to the Drawings, wherein like numbers denote like parts throughout the several views, FIG. 1 illustrates an exemplary hardware and software environment suitable for performing semantic-based difference analysis in connection with adapting or customizing a standard code base consistent with the invention. In particular, FIG. 1 illustrates a development computer 10, which may be implemented by practically any type of computer, computer system or other programmable electronic device, including a client computer, a server computer, a portable computer, a handheld computer, an embedded controller, etc. Moreover, computer 10 may be implemented using one or more networked computers, e.g., in a cluster or other distributed computing system.

Computer 10 typically includes a central processing unit (CPU) 12 including one or more microprocessors coupled to a memory 14, which may represent the random access memory (RAM) devices comprising the main storage of computer 10 as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 20 or on another computer coupled to computer 10.

Computer 10 also typically receives a number of inputs and outputs for communicating information externally. For interface with a user or operator, computer 10 typically includes a user interface 16 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal coupled to the computer (e.g., one of computers 24 coupled to computer 10 over network 22, if computer 10 is implemented as a server or other multi-user computer).

For non-volatile storage, computer 10 typically includes one or more mass storage devices 20, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include an interface 18 with one or more networks 22 (e.g., a LAN, a WAN, a wireless network, and/or the Internet, among others) to permit the communication of information with other computers and electronic devices. It should be appreciated that computer 10 typically includes suitable analog and/or digital interfaces between CPU 12 and each of components 14-20, as is well known in the art.

Computer 10 operates under the control of an operating system (not shown), and executes or otherwise relies upon various computer software applications, components, programs, objects, modules, data structures, etc. (e.g., an integrated development environment 26, which supports the herein-described functionality to adapt standard source code 28 to modified source code 30). Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Turning to FIG. 2, the sequence of steps associated with adapting a standard code base without the use of difference data, as may be performed in connection with adapting a first release of a code base, is illustrated. In particular, an overall adaptation process 40 is illustrated for adapting standard source code 42 to modified source code 44. Given that process 40 may be utilized to adapt any release of a code base, the standard and modified source codes are respectively designated as S_N and M_N, where N is reflective of a release of a "code base."

Process 40 includes both automated and manual changes to the standard source code. As shown in block 46, for example, an automatic analysis/intermediate code generation process (PA) is illustrated as generating first intermediate source code (I_N) 48. This intermediate source code is then further modified in block 50 via a manual test and change process (PM). As noted above, the automated process 46 may include various operations such as automated source transformation, and may additionally include, for example, generation of stub and proxy classes, among other transformations.

The manual changes implemented in block 50 are further illustrated in FIG. 2. For example, as shown in block 52, a work copy 54 of the intermediate source code may be created, with this work copy supplied to a compile/test process block 56 that attempts to compile the intermediate source code and test the operation of the compiled code to ensure the code works as desired. Based upon the performance of the tests on the compiled code, block 58 either saves the source code in block 60, or alternatively, proceeds to block 62 to analyze the failing tests, and based upon such analysis, to implement manual code changes as shown in block 64. The manual code changes are applied to work copy 54, and the modified work copy is then recompiled and tested in block 56 as described above.

It will be appreciated that many of the tasks undertaken in connection with compiling, testing, analyzing and applying code changes in blocks 56, 62, and 64, are performed by a developer, and furthermore, that the compile, test, analyze and create manual code changes sequence may be repeated several iterations until the desired source code has been generated. It will also be appreciated that this sequence of operations can be tedious and time consuming, particularly when a relatively large code base is being adapted.

Now turning to FIG. 3, the overall process 40, including processes PA 46 and PM 50, are illustrated as adapting a first version of a standard source code (S_0) to intermediate and modified versions of this first release of the source code, respectively designated as I_0 and M_0.

FIG. 3 also illustrates the sequence of operations that occur in connection with performing semantic-based difference analysis to facilitate the application of changes made to the first release of the standard source code to future releases of the source code.

In particular, block 70 illustrates a semantic-based difference analysis process (PS) that processes the intermediate (I_0) and modified (M_0) versions of the first release of the standard source code to generate difference data 72, also referred to herein as a DELTA file (DELTA_0). As discussed above, the difference data may include both manual and automated changes made to the standard source code, or alternatively, only manual changes, and that typically this difference data is organized so as to identify changed semantic components in the source code. The difference data may identify all semantic components in the source code, or alternatively, only those semantic components that have changed as a result of adaptation of the standard source code.

As shown in FIG. 3, by virtue of the semantic-based difference analysis being performed between the modified and intermediate versions, only manual changes are reflected in difference data 72. In other embodiments, however, the semantic-based difference analysis process may be performed between the modified and standard versions (e.g., versions M_0 and S_0) to incorporate both manual and automated changes into the difference data.

The difference data, once generated, may be used to supplement the automated adaptation of a future release of standard source code. Block 74, in particular, illustrates a modified overall process that is used to adapt a future release of the source code (e.g., a second release denoted by S_1, or a third release denoted by S_2). In this modified process, the automatic analysis/intermediate code generation process PA utilized in block 40 is replaced by an automatic analysis/intermediate code generation process using DELTA file process (PD) shown in block 76. The result of process PD is the generation of an intermediate source code 48 (e.g., source code I_1 or I_2); however, typically the intermediate source code of the later releases incorporates some or all of the manual changes made in the prior release(s).

While it may be that all necessary manual changes are automatically applied in block 76, in many instances, some additional manual changes will be required, or in the least, compilation and testing of the intermediate source code will be required to verify the correct operation of the modified code. As such, a manual test and change process (PM) 50 is still typically incorporated into process 74. As a result of the incorporation of some or all of the manual changes from the prior release, which are reflected in the difference data, it will be appreciated that often the manual changes required in process 74 are substantially reduced as compared to process 40.

It may be seen also from FIG. 3 that subsequent releases typically incorporate difference data from prior releases. It will also be appreciated that, in some embodiments, it may be desirable to utilize the difference data from one release for multiple subsequent releases. Moreover, in some embodiments, difference data from multiple prior releases may be combined.

FIG. 4 next illustrates semantics-based difference analysis process (PS) 70 in greater detail. Process 70 includes a canonicalizing parser (CP) 80 receives as input the intermediate source code (I_N) 48, and outputs therefrom a first intermediate canonical form or representation (I_N_CANON) 82. Likewise, canonicalizing parser 80 also receives as input modified source code (M_N) 44 and outputs therefrom a modified canonical form or representation (M_N_CANON) 84. Both forms 82, 84 are canonicalized and parsed into semantic components organized in a predetermined fashion, and with extraneous data such as comments removed. As such, each of these forms may be input into a difference extraction and packaging (DIFF) process 86 that compares these canonical forms to identify changes to particular semantic components, as well as to identify new or removed semantic components. Process 86 outputs the difference data 72 representing the differences in these semantic components. As noted above, the difference data may be generated, for example, in the format of one or more XML files including tags representative of the semantic components that have changed. Other manners of representing the difference data may be used in the alternative.

Figure 5:
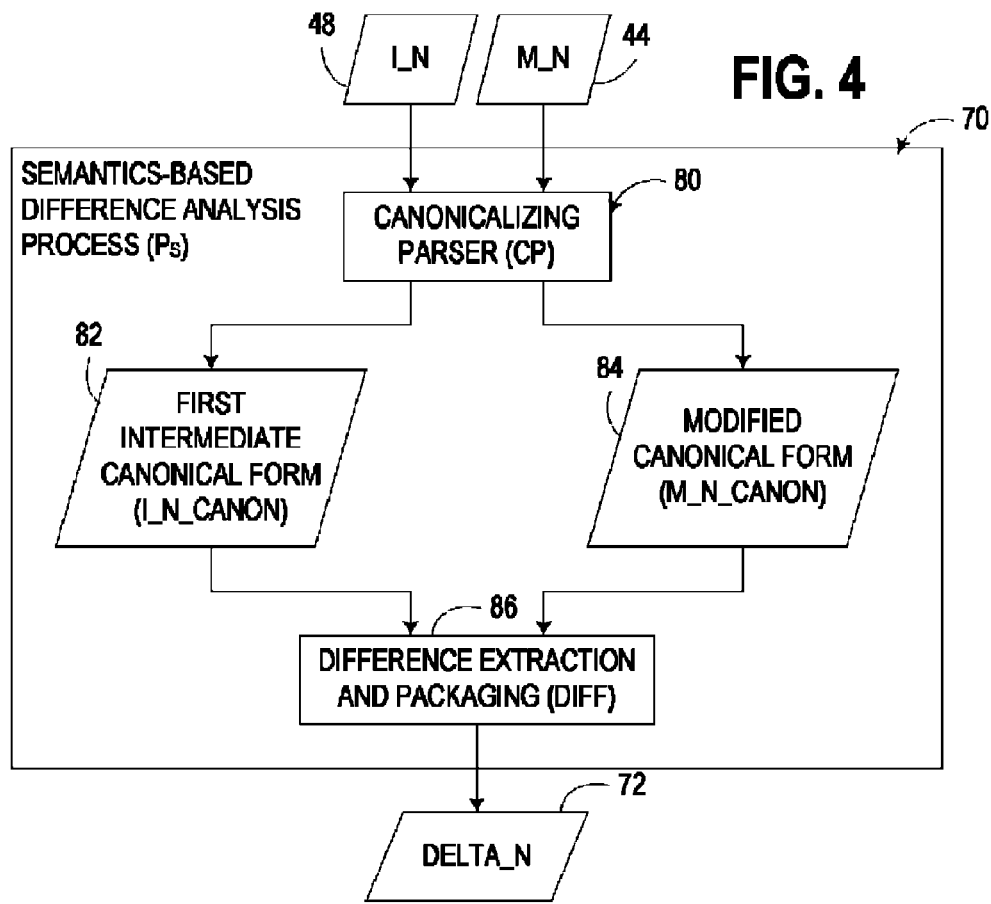
FIG. 5 is a block diagram of an exemplary segment of source code capable of being parsed by the canonicalizing parser referenced in FIG. 4.
Figure 7:
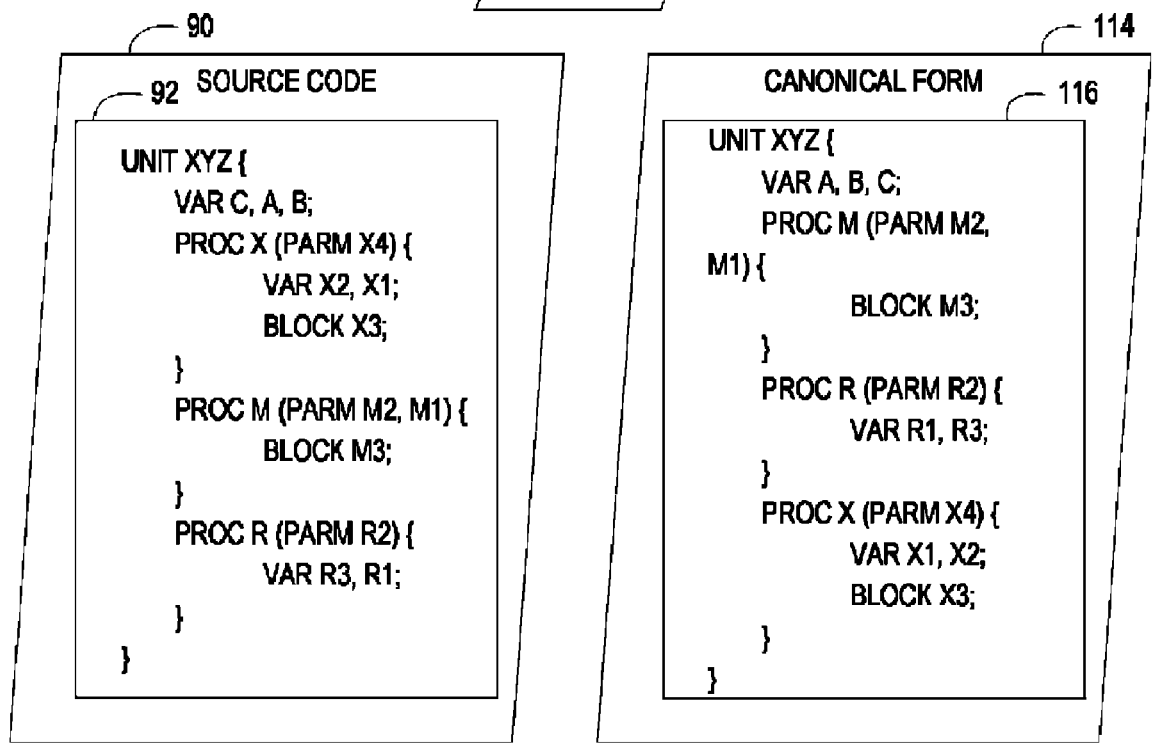
FIG. 7 is a block diagram of a canonical form of the exemplary segment of source code after parsing by the canonicalizing parser referenced in FIG. 4.
Figure 6:
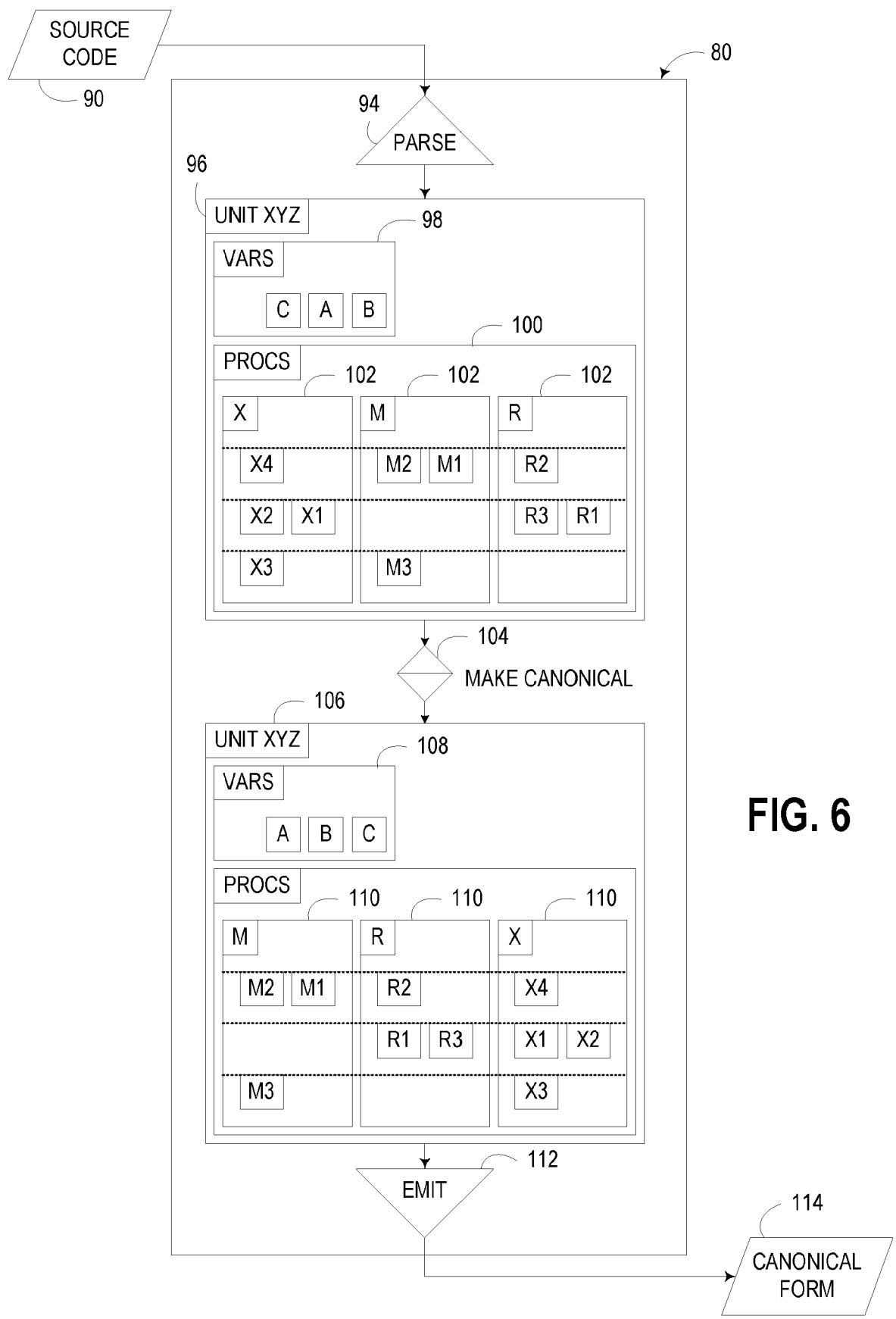
FIG. 6 is a block diagram illustrating the parsing of the exemplary segment of source code of FIG. 5 using the canonicalizing parser referenced in FIG. 4

FIGS. 5-7 next illustrate an exemplary parsing of source code by canonicalizing parser 80. In particular, FIG. 5 illustrates exemplary source code 90 including a semantic component 92 designated as "Unit XYZ." Unit XYZ is illustrated as including a variable declaration of variables C, A, and B, as well as three procedure declarations designated as procedures X, M, and R. Procedure X has an input parameter X4, as well as local variable declarations X2 and X1. Furthermore, a block of code designated as X3 is also provided in the procedure. Procedure M has two input parameters M2, M1, and a block of code designated at M3, while procedure R has an input parameter R2 and a pair of declared variables R3, R1.

FIG. 6 illustrates the operations that may be applied to source code 90 by canonicalizing parser 80. In particular, source code 90 is parsed as illustrated at 94, resulting in the generation of a data structure 96 representative of the semantic components in unit XYZ. The data structure identifies the variables as shown at 98, as well as the procedures as shown at 100. In addition, within each procedure 102, the semantic components defined within such procedures are illustrated, with dashed lines illustrating the delineations between semantic element types. In FIG. 6, for example, three sections are illustrated in each procedure, for parameters, local variables and code blocks. It should be noted that only parameters are prohibited from being reordered.

Once the source code is parsed into data structure 96, the data structure is made canonical as illustrated at 104, resulting in the generation of a canonical data structure 106, including variable declarations as shown at 108, and procedure declarations as shown at 110. As may be seen from FIG. 6, canonicalizing data structure 96 results, for example, in the reordering of the variable declarations, as well as the reordering of the procedures and a reordering, when appropriate, of the internal variable declarations in those procedures.

Thereafter, the canonicalized data structure 106 is emitted as shown at block 112 to create the resulting canonical form 114. FIG. 7, for example, illustrates the canonical form 114 of unit XYZ, now designated as semantic component 116.

It will be appreciated that, in some embodiments, actual re-generation of source code is not necessary, provided that the difference extraction process can use the internal "parsed tree" for each canonical form being compared. In the alternative, however, canonical source code can be emitted to enable difference processing to be performed over the decomposed source code, and with the difference output used to feed into an identification and packing phase of the overall differencing process.

Figure 8:
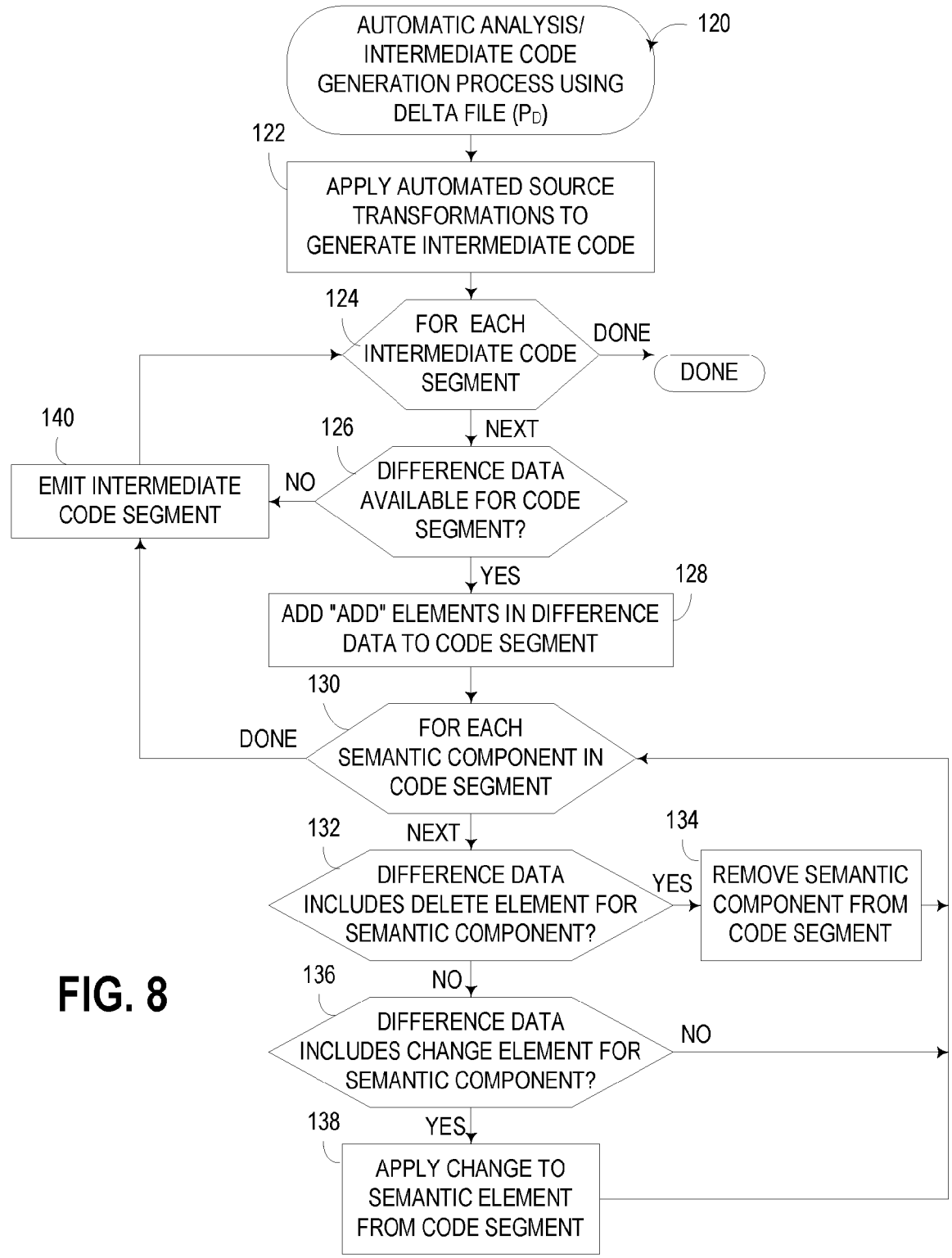
FIG. 8 is a flowchart illustrating the program flow of the automatic analysis/intermediate code generation process using delta file block referenced in FIG. 3.

FIG. 8 next illustrates at 120 a routine that may be performed by automatic analysis/intermediate code generation process using DELTA file (PD) block 76 of FIG. 3. In particular, this process may begin at block 122 by applying automated source transformations to generate an intermediate code, similar to that used in conventional automated adaptation of source code. It should also be noted that, while such automated source transformations are illustrated as being separate from and preceding the incorporation of changes via the difference data, in other embodiments different orderings of these operations may be used, and moreover, these operations may be combined into an overall process.

Next, block 124 initiates a FOR loop to process each segment of the intermediate code. Each segment may be, for example, a separate file. Alternatively, a segment may comprise a section of a file, whereby parsing of a file into sections may also be performed by routine 120. It will also be appreciated that various manners of partitioning source code into segments may be used, and in some embodiments, the code may not be partitioned into segments. As such, block 124 may be omitted in some embodiments, with only a single pass used to process the source code.

Next, block 126 determines difference data exists for the intermediate code segment, and if so, that difference data is retrieved, e.g., by retrieving one or more XML files associated with the intermediate code segment being processed. In particular, in the embodiment discussed herein, it is assumed that the difference data includes "add" elements indicating semantic components that should be added to a code segment, "delete" elements indicating semantic components that should be removed from a code segment, and "change" elements indicating semantic components that should be changed in the code segment. Other types of elements, e.g., "replace" elements, may be used in other embodiments.

If no difference data is available for a given code segment, the code segment may simply be emitted or saved, e.g., by passing control to block 140, whereby control then returns to block 124 to process additional code segments.

If difference data is available, however, control passes to block 128 to add any "add" elements defined in the difference data for the code segment. Control then passes to block 130 to initiate a loop to process each semantic component defined in the intermediate code segment. For each such semantic component, control passes to block 132 to determine whether the difference data for the code segment includes a delete element that indicates that the semantic component should be deleted. If so, control passes to block 134 to delete the semantic component from the intermediate code segment, whereby control then returns to block 130 to process additional semantic components.

Otherwise, control passes to block 136 to determine whether the difference data for the code segment includes a change element that indicates that the semantic component should be changed. If so, control passes to block 138 to change the semantic component in the intermediate code segment, whereby control then returns to block 130 to process additional semantic components. Also, if block 136 determines that no change element exists, control returns directly to block 130.

Once each semantic component in the current intermediate code segment has been processed, block 130 passes control to block 140 to emit or save the intermediate code segment in its modified form. Control then returns to block 124 to process additional intermediate code segments. Once all such intermediate code segments have been processed, routine 120 is complete.

How changes are applied to a semantic component in block 138 above may differ in different embodiments. For example, in one embodiment, change elements may be associated with types, such as "procedure", "variable", or "import", among others. A change element for a "procedure" type may implement a change, for example, by replacing the body of the procedure with code stored in the change element. A change element for a "variable" type may implement a change, for example, by replacing the initial value of the variable with a value stored in the change element. Likewise, a change element for an "import" type may implement a change, for example, by replacing and/or changing the imports to those identified in the change element.

It should be appreciated that, in lieu of, or in addition to, automatically applying a change, addition or deletion to a code segment, a notification may also be generated for a user. Notifying a user may take a number of forms consistent with the invention. For example, such notification may be provided by a log, whereby the changes in the intermediate code are logged into a single file for later review by a user. In the alternative, a user may be notified immediately upon the detection of each change requiring such notification. In addition, it should be appreciated that, where a particular semantic component is added to a new release of a code base, it may be desirable to additional notify a user of the new semantic component. Other manners of and situations for notifying a user may be used in the alternative.

It will therefore be appreciated by one of ordinary skill in the art having the benefit of the instant disclosure that the herein-described semantic-based adaptation of a standard code base provides the ability to substantially reduce the amount of manual changes that need to be reapplied to subsequent releases of a standard code base. Duplication of effort, and needless expenditures of resources, associated with adapting standard code bases are therefore often minimized.

Various modifications may be made to the illustrated embodiments without departing from the spirit and scope of the invention. The invention is therefore set forth in the claims hereinafter appended.

What is claimed is:

1. An apparatus, comprising:
a memory;
at least one processor; and
program code resident in the memory and configured to execute on the at least one processor to adapt a standard code base, the program code configured to:
canonically parse a modified version of a first release of a standard code base to generate a canonically-parsed representation of the modified version, wherein the modified version is adapted from the first release of the standard code base by an entity other than that which developed the first release of the standard code base, and for the purpose of adapting the first release of the standard code base to operate on a particular type of computer;
generate difference data representative of changes made to the first release of the standard code base using the canonically-parsed representation of the modified version;
use the difference data in applying the changes made to the first release of the standard code base to a second release of the standard code base to generate a modified version of the second release of the standard code base that adapts the second release of the standard code base to operate on the particular type of computer; and
canonically parse an intermediate version of the first release of the standard code base to generate a canonically-parsed representation of the intermediate version, wherein the program code is configured to generate the difference data by comparing the canonically-parsed representations of the intermediate and modified versions of the first release of the standard code base, wherein the intermediate version of the first release of the standard code base is generated using automated source transformation, and wherein the modified version of the first release of the standard code base is generated by applying manual changes to the intermediate version of the first release of the standard code base.

2. The apparatus of claim 1, wherein the program code is further configured to canonically parse an unmodified version of the first release of the standard code base to generate a canonically-parsed representation of the unmodified version, and wherein the program code is configured to generate the difference data by comparing the canonically-parsed representations of the unmodified and modified versions of the first release of the standard code base.

3. The apparatus of claim 1, wherein the program code is configured to generate the difference data by identifying a plurality of changed semantic components in the modified version of the first release of the standard code base.

4. The apparatus of claim 3, wherein the program code is configured to identify the plurality of changed semantic components by identifying a change made to a selected semantic component, wherein the change is selected from the group consisting of deletion, modification, addition and replacement.

5. The apparatus of claim 4, wherein the program code is configured to generate the difference data by generating at least one XML file, the XML file including a tag for a changed semantic component, the tag identifying the changed semantic component and including an attribute representing the change made to the changed semantic component.

6. The apparatus of claim 3, wherein the program code is configured to use the difference data in applying the changes made to the first release of the standard code base to the second release of the standard code base by notifying a user of a change in a changed semantic component.

7. The apparatus of claim 3, wherein the program code is configured to use the difference data in applying the changes made to the first release of the standard code base to the second release of the standard code base by automatically applying a change in a changed semantic component to the second release of the standard code base.

8. The apparatus of claim 1, wherein the program code is further configured to use the difference data in applying the changes made to the first release of the standard code base to a third release of the standard code base.

9. The apparatus of claim 1, wherein the standard code base comprises system-independent program code configured to execute on a plurality of types of computers, and wherein the modified version is adapted from the first release of the standard code base for the purpose of adapting the first release of the standard code base to operate on a particular type of computer.

10. The apparatus of claim 1, wherein the standard code base comprises a library configured to run on a single-user computer, and wherein the modified version is adapted from the first release of the standard code base for the purpose of adapting the first release of the standard code base to operate in a client/server environment.

11. The apparatus of claim 10, wherein the standard code base comprises a graphical user interface library configured to display graphical user interface components on a same computer upon which the standard code base is run, and wherein the modified version is adapted from the first release of the standard code base for the purpose of adapting the graphical user interface library in the first release of the standard code base to initiate a display of graphical user interface components on a different computer from which the standard code base is run.

12. A program product, comprising:
a recordable computer readable medium; and
executable program code stored on the recordable computer readable medium and configured to adapt a standard code base, wherein the executable program code is configured to:
canonically parse a modified version of a first release of a standard code base to generate a canonically-parsed representation of the modified version, wherein the modified version is adapted from the first release of the standard code base by an entity other than that which developed the first release of the standard code base, and for the purpose of adapting the first release of the standard code base to operate on a particular type of computer;
generate difference data representative of changes made to the first release of the standard code base using the canonically-parsed representation of the modified version;
use the difference data in applying the changes made to the first release of the standard code base to a second release of the standard code base to generate a modified version of the second release of the standard code base that adapts the second release of the standard code base to operate on the particular type of computer; and
canonically parse an intermediate version of the first release of the standard code base to generate a canonically-parsed representation of the intermediate version, wherein the program code is configured to generate the difference data by comparing the canonically-parsed representations of the intermediate and modified versions of the first release of the standard code base, wherein the intermediate version of the first release of the standard code base is generated using automated source transformation, and wherein the modified version of the first release of the standard code base is generated by applying manual changes to the intermediate version of the first release of the standard code base.

13. The program product of claim 12, wherein the program code is further configured to canonically parse an unmodified version of the first release of the standard code base to generate a canonically-parsed representation of the unmodified version, and wherein the program code is configured to generate the difference data by comparing the canonically-parsed representations of the unmodified and modified versions of the first release of the standard code base.

14. The program product of claim 12, wherein the program code is configured to generate the difference data by identifying a plurality of changed semantic components in the modified version of the first release of the standard code base.

15. The program product of claim 14, wherein the program code is configured to identify the plurality of changed semantic components by identifying a change made to a selected semantic component, wherein the change is selected from the group consisting of deletion, modification, addition and replacement.

16. The program product of claim 15, wherein the program code is configured to generate the difference data by generating at least one XML file, the XML file including a tag for a changed semantic component, the tag identifying the changed semantic component and including an attribute representing the change made to the changed semantic component.

17. The program product of claim 14, wherein the program code is configured to use the difference data in applying the changes made to the first release of the standard code base to the second release of the standard code base by notifying a user of a change in a changed semantic component.

18. The program product of claim 14, wherein the program code is configured to use the difference data in applying the changes made to the first release of the standard code base to the second release of the standard code base by automatically applying a change in a changed semantic component to the second release of the standard code base.

19. The program product of claim 12, wherein the program code is further configured to use the difference data in applying the changes made to the first release of the standard code base to a third release of the standard code base.

20. The program product of claim 12, wherein the standard code base comprises system-independent program code configured to execute on a plurality of types of computers, and wherein the modified version is adapted from the first release of the standard code base for the purpose of adapting the first release of the standard code base to operate on a particular type of computer.

21. The program product of claim 12, wherein the standard code base comprises a library configured to run on a single-user computer, and wherein the modified version is adapted from the first release of the standard code base for the purpose of adapting the first release of the standard code base to operate in a client/server environment.

22. The program product of claim 21, wherein the standard code base comprises a graphical user interface library configured to display graphical user interface components on a same computer upon which the standard code base is run, and wherein the modified version is adapted from the first release of the standard code base for the purpose of adapting the graphical user interface library in the first release of the standard code base to initiate a display of graphical user interface components on a different computer from which the standard code base is run.

* * * * *